Aug. 22, 1933.                G. LUFKIN                1,923,942
                             GLASS FURNACE
                          Filed Sept. 4, 1930           3 Sheets-Sheet 2
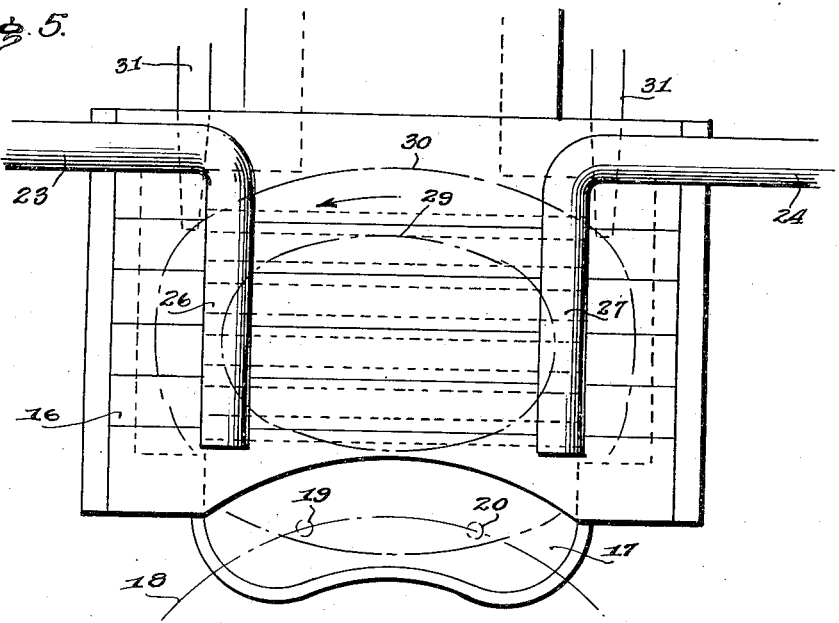
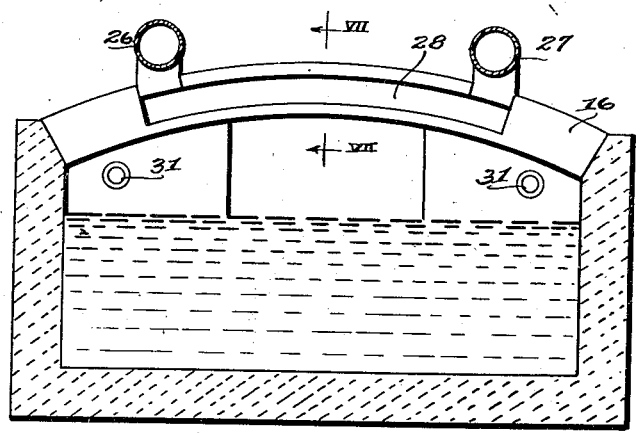
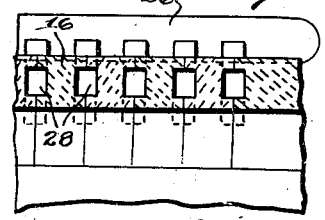
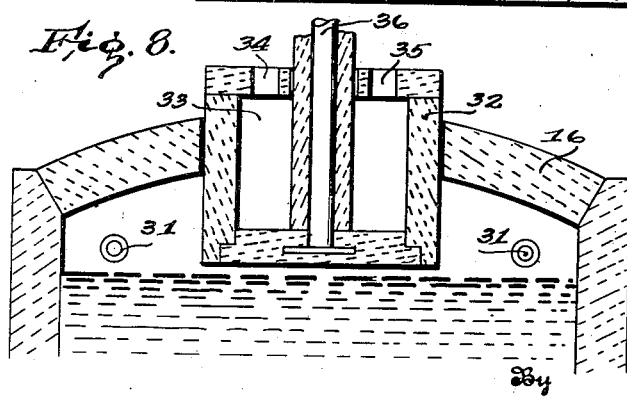
Inventor
Garland Lufkin
By J. F. Rule
Attorney Aug. 22, 1933.     G. LUFKIN     1,923,942
GLASS FURNACE
Filed Sept. 4, 1930     3 Sheets-Sheet 3
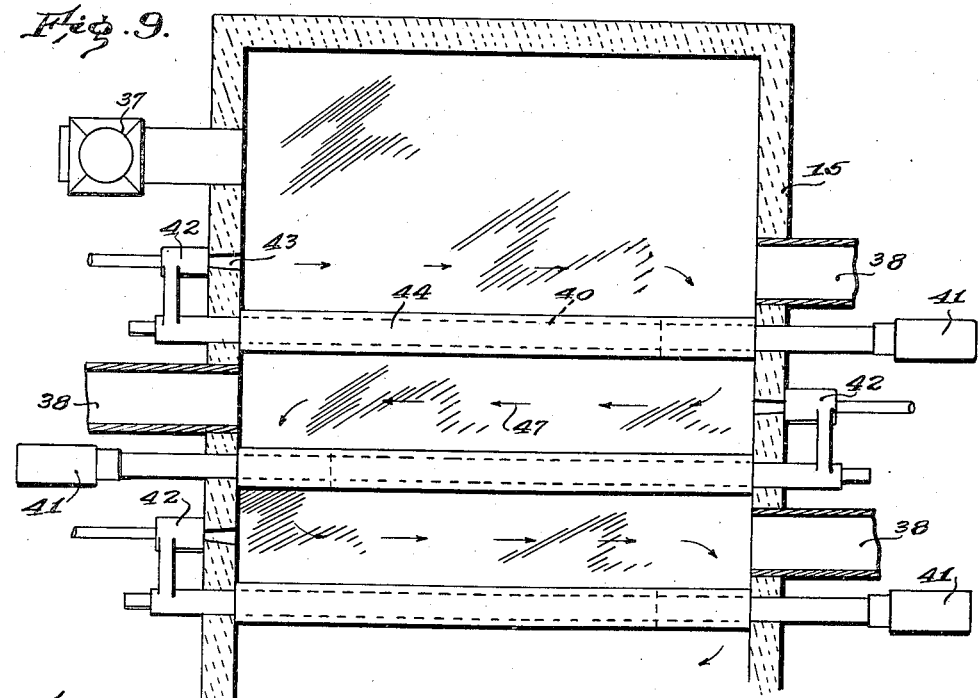
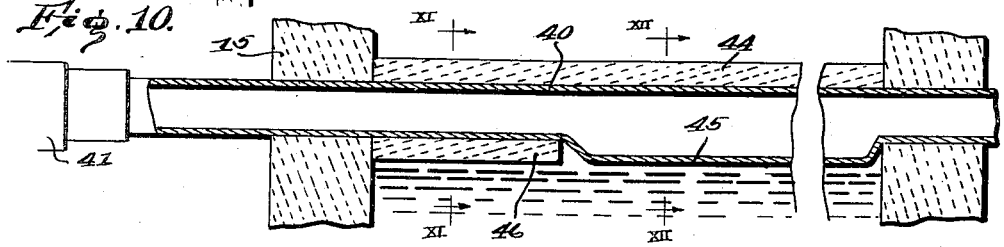
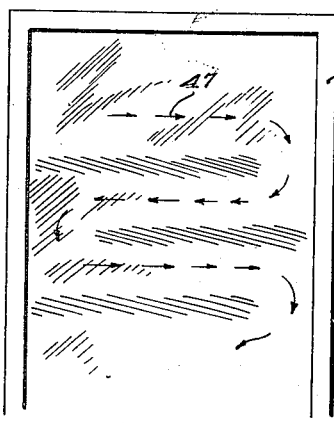
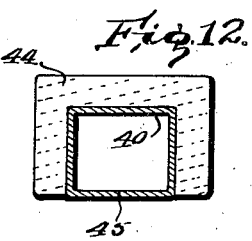

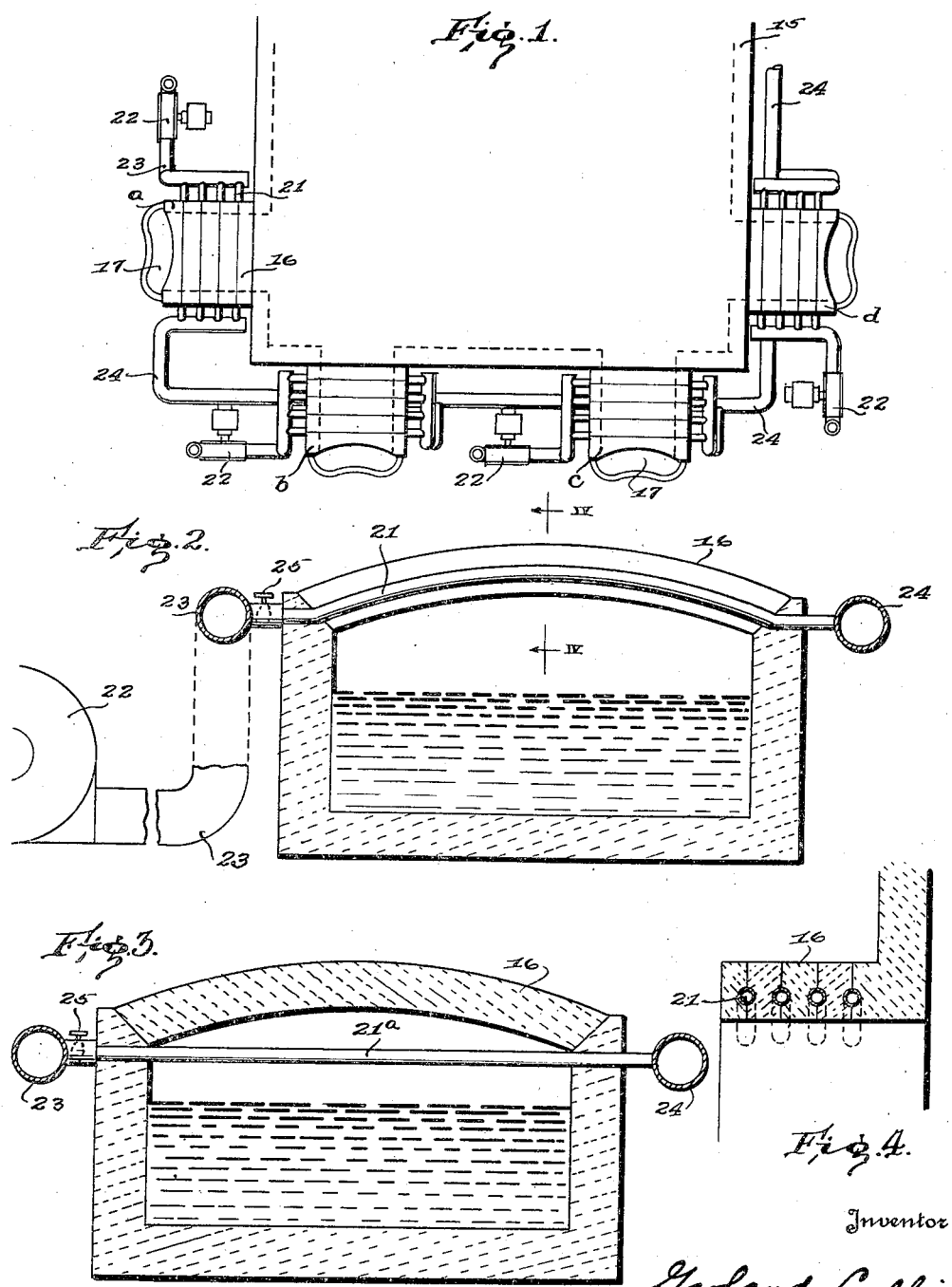

Patented Aug. 22, 1933

1,923,942

UNITED STATES PATENT OFFICE 1,923,942

GLASS FURNACE

Garland Lufkin, Toledo, Ohio, assignor to Owens-Illinois Glass Company, a Corporation of Ohio Application September 4, 1930. Serial No. 479,660

21 Claims. (Cl. 49—54)

My invention relates to glass melting furnaces and particularly to means for regulating and controlling the path of movement of the glass in the furnace and in the furnace extensions or forebays from which the glass is drawn, and means for regulating and controlling the temperature of the glass delivered from the furnace.

In the practical operation of glass melting furnaces difficulty is usually experienced in maintaining uniform temperature conditions at the point at which the glass is drawn from the furnace. The operation of melting the glass batch raises the temperature of the glass considerably above the required working temperature so that it is necessary to cool the molten glass to a certain extent during its passage from the melting zone to the gathering area or the point at which the glass is delivered from the furnace. There is also a tendency for the glass to flow in a direct line or channel from the melting zone to the gathering point so that usual furnace conditions do not permit adequate and uniform cooling of the glass to the proper working temperature.

An object of the present invention is to overcome this difficulty by controlling the flow of glass and causing it to follow a devious path from the melting point to the gathering point or furnace outlet, and also providing adjustable cooling means for lowering the temperature of the glass to any desired extent during its passage through the furnace, so that the temperature may be accurately controlled with a constant temperature and quality of output for a given load. By thus lengthening and controlling the path of flow of the glass, the further object is attained of reducing the maximum required temperature at the melting point and thereby reducing the amount of fuel required for the melting operation.

A further object of the invention is to provide means for controlling the path of flow and temperature of the glass in the individual forebays or furnace extensions from which the glass is gathered by means of suction gathering molds. When the glass is thus gathered it is necessary to maintain a circulation of the glass past the gathering point in order to prevent accumulation of portions of glass chilled by contact with the molds or shears, exposure to the air, etc. The present invention provides for directing and controlling the circulation and temperature of the glass in the forebays, by locating heat receiving surfaces adjacent to predetermined surface areas of glass in the forebays. Heat is extracted by radiation to said receiving surfaces and the glass thereby cooled to the desired working temperature. Also in this manner a localized area may be cooled adjacent the gathering point and thereby direct the flow of glass in a path surrounding the cooled area. Thus there is provided an adequate circulation of the glass at the gathering area and the temperature may be accurately regulated and controlled.

Other objects of the invention will appear hereinafter.

In the accompanying drawings:

Fig. 1 is a fragmentary plan view, partly diagrammatic, of a furnace constructed in accordance with my invention.

Fig. 2 is a sectional elevation on a larger scale, of one of the forebays shown in Fig. 1.

Fig. 3 is a view similar to Fig. 2 showing a modified construction.

Fig. 4 is a section at the line IV—IV of Fig. 2.

Fig. 5 is a plan view of still another form of forebay.

Fig. 6 is a sectional elevation of the same.

Fig. 7 is a fragmentary sectional elevation at the line VII—VII of Fig. 6.

Fig. 8 is a sectional elevation showing a further modification of the means for controlling the temperature in the forebays.

Fig. 9 is a sectional plan of a portion of the furnace and shows particularly the means for cooling certain areas of the glass and controlling its path of flow.

Fig. 10 is a fragmentary sectional elevation showing one of the air cooled pipes.

Figs. 11 and 12 are sectional views taken at the lines XI—XI and XII—XII respectively, of Fig. 10.

Fig. 13 is a diagrammatic view indicating the path of the flow of glass in the furnace.

Referring to Fig. 1, the furnace 15 is provided with extensions or forebays "a", "b", "c" and "d" to which the molten glass is supplied and from which the glass is drawn as by means of suction gathering molds. Each forebay is provided with a roof 16 and at its forward end is open to provide an exposed gathering area 17. The gathering molds which may be mounted as usual on a continuously rotating mold carriage, travel in a circular path 18 (Fig. 5) over the gathering area 17 and dip into the glass at the point 19 to gather the charges of glass by suction. After a mold is filled by suction it is lifted and the glass is severed when the mold reaches the point 20, permitting the severed tail of glass to drop back into the supply body.

In order to prevent excessive chilling of the glass at the gathering area and to carry the portions of glass which have been chilled by the mold and cutter, away from the gathering area for reheating and reassimilation in the supply body of glass, it is necessary to maintain a circulation of the glass past the gathering area. For the purpose of controlling and extending the path of movement of the glass, the present invention provides means for extracting heat from localized areas adjacent to the gathering point. To this end there are provided cooling pipes 21 (Figs. 1 and 2) embedded in the roof 16 and extending across the forebay. As shown in Figs. 1, 2 and 4, the roof 16 comprises a series of parallel blocks of refractory material and the pipes 21 are located at the meeting faces of these blocks, each pipe being partly embedded in both the meeting faces of the two adjoining blocks. A cooling medium such as air or water, preferably air, is caused to flow through the pipes 21, and for this purpose there is associated with each forebay, a fan or blower 22 connected through a main pipe 23 with the parallel branch pipes 21.

The air after it passes through the pipes 21 is exhausted into a main exhaust pipe 24 to which the pipes 21 of all of the forebays may be connected. The air which has been heated during its passage through the pipes 21 may be carried by the pipe 24 to the burners 42 (Fig. 9) hereinafter referred to, and utilized in the combustion of the fuel gases for the main furnace.

All of the pipes 21 may be provided with individual control valves 25 (Fig. 2). The pipes 21 absorb heat from the roof 16 which in turn absorbs heat radiated from the surface of the glass therebeneath. By cooling the roof 16 in the manner indicated, the temperature of the glass may be lowered as required to provide the desired working temperature at the gathering area 17. This temperature may be raised or lowered as conditions may require, by adjustment of the valves 25. Individual adjustment of said valves also enables the position and extent of the cooling area to be varied and controlled.

As shown in Fig. 3, the cooling pipes 21ª may extend through the forebays at a plane below the roof 16. In this manner, the pipe is exposed directly to the heat radiated from the glass and is, therefore, more effective as a cooling medium. Also, by having the pipes separate from the roof, they may be located as close to the surface of the glass as desired, and in some instances may be partly or wholly immersed in the molten glass.

Figs. 5 to 7 illustrate a modification in which the supply and exhaust mains 23 and 24 extend over the roof 16 and include arms or extensions 26 and 27 positioned inward at a distance from the side walls of the forebay and extending parallel therewith. The roof 16 is in this instance provided with channels or passageways 28 extending along the roof 16 and at their ends opening into the pipes 26 and 27. The channels 28 terminate some distance inward from the side walls of the furnace forebay, so that the cooling effect of the air circulating therethrough is confined mainly to a localized area which does not extend the full width of the forebay. The effect of this is to extend and control the path of movement of the glass which is put into circulation by the movement of the molds in the glass at the gathering area, such movement being supplemented by any auxiliary glass circulating means that may be employed. The area of cooled glass is represented in a general way by the oval bounded by the broken line 29 (Fig. 5), and the path of movement of the glass is represented in a general way by the surrounding area comprised between the broken lines 29 and 30. The cooled area prevents the glass which moves over the gathering area from returning through a short circuit to the gathering point. By thus extending and controlling the path of movement of the glass, chilled tails of glass severed from the molds and the portions chilled by contact of the molds with the glass during the gather are carried back into a reheating zone where they are remelted and reassimilated before being brought again to the gathering point. The temperature of the glass may be further regulated by supplying a heat regulating medium through pipes 31 adjacent opposite sides of the forebay. Either burners or cooling air may be provided at these points, as may be required to supply the desired temperature conditions.

Fig. 8 illustrates a further modification in which a box-like structure 32 of refractory material is provided and extends downward through an opening in the roof 16. The interior of the box 32 constitutes a temperature regulating chamber 33 having inlet and outlet openings 34 and 35 for the circulation of air or other heat regulating medium. If desired, a fan or blower may be used to circulate the air as in the other forms of the invention. A central shaft 36 provides a convenient means for lifting and lowering the box 32, which may be adjusted to position its lower surface at any desired distance above or below the level of the glass.

Referring particularly to Figs. 9 to 13, I have shown means for causing the glass to flow in a devious path from the melting point toward the points of discharge. In the particular construction shown the glass is caused to move in a zigzag path through the main furnace 15. The furnace as here shown is provided with a batch feeder 37, which may be of usual construction, for supplying the raw materials to the furnace. Burners are provided as usual for melting the batch. These include burners 42 alternating with vent pipes 38 through which the waste gases of combustion are exhausted. In order to control the path of the glass in its passage through the furnace, there are provided a plurality of cooling pipes 40 extending horizontally through the furnace from one side thereof to the other. These pipes are preferably positioned a short distance above the normal level of the glass in the furnace and are spaced apart and parallel with each other. Each pipe 40 extends through openings in the side walls of the furnace, the pipe being extended beyond said walls. At one end of each pipe 40 is a blower 41 by which air is forced through the pipe. The opposite end of said pipe may communicate with a burner 42 and supply heated air for combustion to said burner. The burner is designed to project a flame through an opening 43 in the furnace wall and into contact with the glass, the gases of combustion being directed across the furnace to an exhaust pipe 38 at the opposite side of the furnace. Each pipe 40 is made of metal and is partly surrounded by refractory heat insulating tile 44 or other insulating material. This insulation 44, as shown in Fig. 12, covers the upper and side walls of the pipe, the lower face 45 being left bare and exposed directly to the heat radiated from the glass therebeneath. Adjacent one wall of the furnace, the pipe 40 is entirely surrounded by the insulating material which comprises a layer 46 of insulation interposed between the pipe and the glass therebeneath. The section of the pipe which is completely surrounded by insulation may be of reduced depth, as shown in Figs. 10 and 11, to provide space for the insulating material therebeneath. It will be noted that the blowers 41 are located alternately at opposite sides of the furnace. Each insulated section 46 is located next to the side wall of the furnace adjacent the corresponding blower, so that said insulated sections 46 are arranged alternately at opposite sides of the furnace in a zigzag fashion.

The effect of the cooling pipes 40 is to extract heat from the surface of the glass directly beneath the exposed portions of the pipes. The cooling effect extends downward for a considerable distance below the surface of the glass. There are thus produced strips or localized zones or areas of comparatively cool viscous glass extending transversely of the furnace and to a greater or less depth, with intermediate areas of comparatively hot molten glass, so that there is provided a zigzag channel or path through which the glass flows from the melting end of the furnace to the forebays or points of discharge. This path is indicated by the arrows 47 (Figs. 9 and 13). If the depth of chilling with the surface tubes alone is insufficient for adequate control of the glass flow, the bottom of the furnace can be cooled in the corresponding zones by cooling channels in or beneath the bottom blocks of the furnace.

Molten glass tends to flow from high temperature to low temperature points on account of convection currents set up therein. That is to say, at the high temperature points (where the flames in the burners 42 play on the glass), the glass tends to build up a higher liquid level on account of expansion, causing a flow toward a lower temperature zone and a return current in the opposite direction underneath the surface. As shown in Fig. 9, the burners are arranged to set up temperature gradients in the direction of normal flow—that is, the path which in general the glass follows in moving from the charging point to the outlets. This, as above indicated, is a zigzag path determined by the localized areas or blocks of comparatively cool viscous glass beneath the cooling pipes 40. It will noted that the gases of combustion from the burners 42 move over the glass in the same general direction as the surface glass directly therebeneath is moving in its zigzag passage through the furnace, so that said gases materially assist in causing and directing the movement of glass through the furnace.

By controlling the path of flow of the glass during the melting and refining operation in a manner to extend the length of said path and the time required for the glass to traverse such path, a much lower temperature is required for melting the glass and the amount of fuel required is materially reduced. Also, a much more constant temperature and quality of glass may be maintained at the gathering tank or outlet of the furnace than is possible with the usual arrangement in which the glass can move in a direct line from the melting point to the furnace outlet.

Modifications may be resorted to within the spirit and scope of my invention.

What I claim is:

1. The method of controlling the path of movement of molten glass which comprises cooling localized portions of a body of glass alternating with uncooled portions united to provide a continuous path for the glass, and causing the glass to move along said path.

2. The method which comprises producing a comparatively low temperature in a restricted portion of a body of molten glass, and causing the adjacent glass of higher temperature to flow in a closed path surrounding and determined by said low temperature portion.

3. The method of producing a flow of glass in a devious path through a body of molten glass and controlling its path of movement, which comprises chilling narrow blocks of the body of glass alternating with unchilled portions united to form a continuous path, and causing the glass to flow in said path.

4. The combination with a furnace to contain molten glass, of means for cooling restricted surface areas of the glass so located that the adjacent uncooled areas form a devious pathway through the furnace, said cooling means including closed passageways in proximity to the surface of the glass and means for circulating a cooling medium through the passageways, and means for causing the glass to flow in said pathway.

5. The combination of a furnace to contain molten glass, and means for cooling restricted zones of the glass, said zones extending alternately from opposite sides of the furnace part way across the furnace and leaving a zigzag body of uncooled glass, said cooling means including closed passageways in proximity to the surface of the glass and means for circulating a cooling medium through the passageways.

6. The combination of a furnace to contain molten glass, means for cooling strips of the surface area of glass extending transversely of the furnace and spaced apart, and means for causing the glass to flow in a devious path extending between said strips, said cooling means including closed passageways in proximity to the surface of the glass and means for circulating a cooling medium through the passageways.

7. The combination with a furnace to contain molten glass, of means for cooling localized areas of glass therein comprising pipes extending across the surface of the glass adjacent thereto and presenting heat absorbing surfaces to adjacent surface portions of the glass, means for causing movement of the glass between said localized areas along a path extending substantially parallel with the pipes, and means for flowing a cooling medium through said pipes.

8. The combination with a furnace to contain molten glass, of means for cooling localized areas of glass therein comprising pipes extending across the surface of the glass adjacent thereto and presenting heat absorbing surfaces to adjacent surface portions of the glass, and means for causing a surface flow of the glass adjoining said cooled areas, said areas so positioned and arranged that the flowing glass is directed and caused to move in a zigzag path through the furnace.

9. The combination with a furnace to contain molten glass, a horizontally disposed pipe extending through the furnace above the glass, said pipe being made of metal and comprising an insulated section and a section providing an uninsulated surface facing the glass, and means for circulating a cooling medium through said pipe.

10. The combination with a furnace to contain molten glass, of a cooling pipe extending across the furnace above the glass therein, a burner arranged to direct a flame over the surface of the glass adjacent to and in a direction parallel with said pipe, and means for supplying heated air from said pipe to the burner.

11. The combination with a furnace, of a series of parallel cooling pipes extending horizontally through the furnace from one side to the other thereof, each of said pipes comprising a cooling surface facing the glass and extending part way across the furnace and an insulated portion, said insulated portions being arranged in alternation adjacent opposite sides of the furnace.

12. The combination with a furnace, of a series of parallel cooling pipes extending horizontally through the furnace from one side to the other thereof, each of said pipes comprising a cooling surface facing the glass and extending part way across the furnace and an insulated portion, said insulated portions being arranged in alternation adjacent opposite sides of the furnace, and means for causing a surface flow of glass through the furnace in a zigzag path determined by the position and arrangement of the areas of glass cooled by said cooling surfaces.

13. A glass furnace comprising a main tank and an extension, said extension providing at its outer end an exposed gathering area of glass, means utilizing a temperature regulating medium for causing the glass in the main tank to flow in a devious path to said extension and thence to the gathering area, and means for directing a portion of the glass from the gathering area in a closed path through said extension and back to the gathering area.

14. The combination with a glass furnace comprising a main tank and a forebay extension, a roof for said extension, and means providing a series of channels extending through said roof, said channels being of substantially less length than the roof and providing a localized cooling surface by which a local area of the glass in the forebay is chilled.

15. The combination with a glass furnace comprising a main tank and a forebay extension, a roof for said extension, and means for cooling a localized area of the inner surface of said roof and thereby causing extraction of heat by radiation from a localized area of the surface glass within the forebay, said roof area being so located and of such an extent that the chilled area of glass is limited and surrounded by an unchilled area.

16. In a glass furnace, the combination of a melting and refining tank, a batch feeder adjacent one end of the tank, means adjacent the opposite end of the tank for the delivery of molten glass, and means utilizing a temperature regulating medium for directing a flow of glass in a zigzag path from the melting end to the delivery end of the tank.

17. In a glass furnace, the combination of a melting and refining tank, a batch feeder adjacent one end of the tank, means adjacent the opposite end of the tank for the delivery of molten glass, means utilizing a temperature regulating medium for providing a series of obstructions extending transversely of the furnace, and means for causing a flow of glass from the melting end of the furnace toward the delivery end, said obstructions being arranged to direct the flow of glass in a devious path through the furnace.

18. The method of controlling the path of movement of molten glass which consists in cooling localized portions of a body of glass alternating with uncooled portions united to provide a path for the glass, and causing the glass constituting the uncooled portion to move along said path.

19. The combination with a furnace to contain molten glass, of means for defining a path of flow of the glass through the furnace, said means comprising apparatus for cooling localized surface areas of the glass which constitute the marginal portions of the path, and means for causing the glass to move along said path.

20. The combination with a furnace to contain molten glass, said furnace constructed and arranged to present an exposed gathering area, means located over the glass and exterior thereto for chilling a localized area of surface glass adjacent said gathering area and entirely surrounded by comparatively hot fluent glass, and means for causing a localized surface circulation of said fluent glass in a horizontal closed circuit surrounding and determined by said chilled area.

21. The combination with a furnace comprising an extension or forebay providing an exposed gathering area, means located over the glass and exterior thereto for chilling a localized central area of the surface glass in the forebay between the gathering area and the main body of the furnace, said chilled area being of less extent than the area of glass within the forebay and providing a horizontal closed path of comparatively hot fluent surface glass surrounding said chilled area and extending over the gathering area, and means for causing a circulation of the surface glass in said closed path.

GARLAND LUFKIN.